Figures 1, 2:
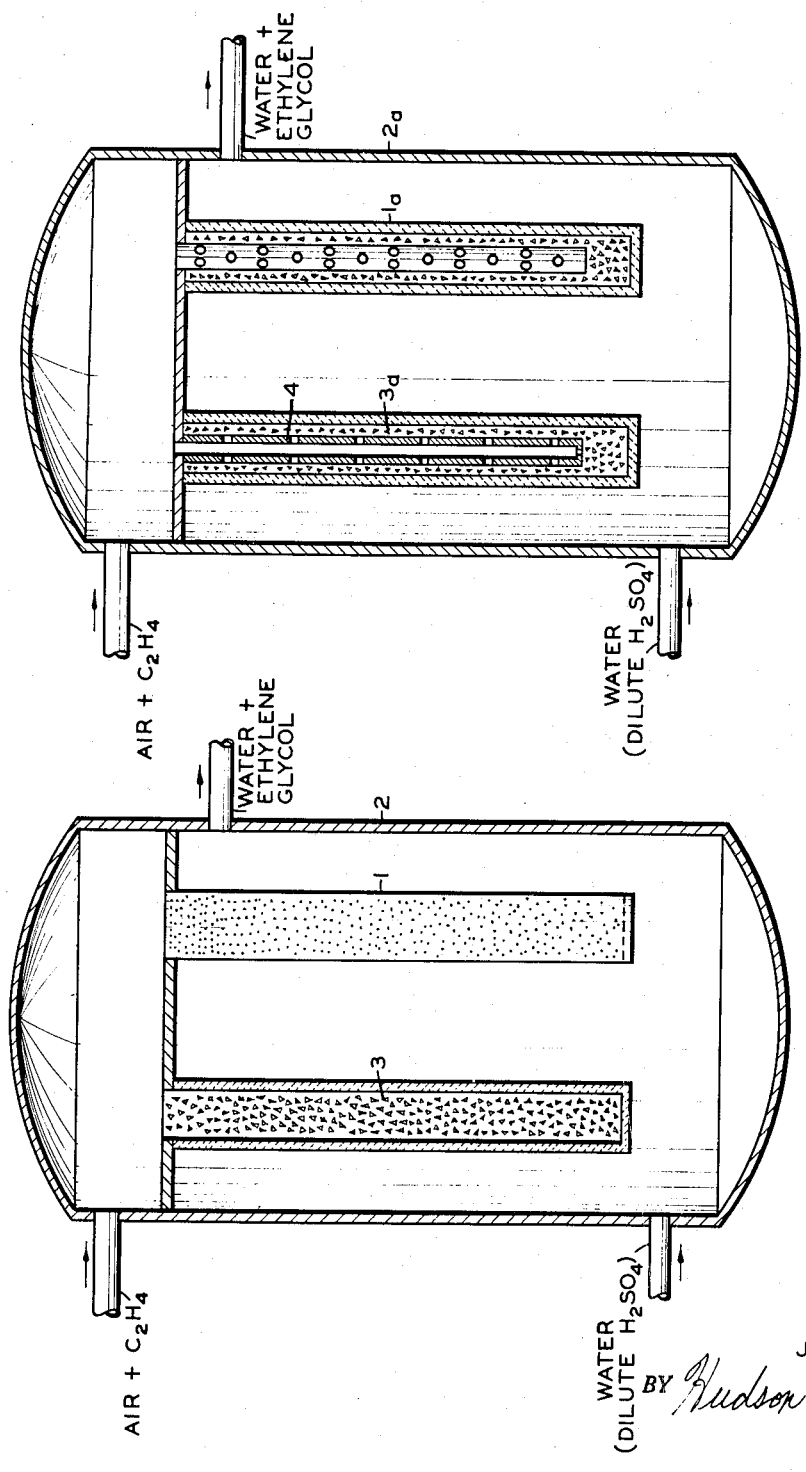

April 17, 1956 — J. M. BROOKE — 2,742,505
MANUFACTURE OF ETHYLENE GLYCOL
Filed Nov. 9, 1951

INVENTOR.
J. M. BROOKE
BY Hudson and Young
ATTORNEYS

United States Patent Office 2,742,505
Patented Apr. 17, 1956

2,742,505

MANUFACTURE OF ETHYLENE GLYCOL

Jesse M. Brooke, Sweeny, Tex., assignor to Phillips Petroleum Company, a corporation of Delaware Application November 9, 1951, Serial No. 255,678

4 Claims. (Cl. 260—635)

This invention relates to ethylene glycol and to its production. In a particular aspect the instant invention relates to a process for preparing ethylene glycol by the oxidation of ethylene.

The most common method for preparing ethylene glycol commercially is the chlorohydrin process wherein ethylene is reacted with chlorine to form ethylene chlorohydrin. The resulting ethylene chlorohydrin is then hydrolyzed to give ethylene glycol. The present invention is concerned with the direct oxidation of ethylene with oxygen to produce ethylene oxide and to the production of ethylene glycol therefrom.

When ethylene glycol is prepared by the direct oxidation of ethylene with air of oxygen, ethylene oxide is formed which can be hydrolyzed to ethylene glycol. To form the ethylene oxide, ethylene and air or oxygen are reacted at an elevated temperature and in the presence of an oxidation-promoting catalyst. Ordinarily ethylene is mixed with a large excess of air, enough to maintain the concentration below the explosive limits, and the gas mixture is introduced into a catalytic converter in which the temperature is carefully controlled at the optimum temperature. While reactions within the explosive limits are operable to carry out this invention, and are described in the second and third paragraph below, they are not preferred for commercial operations of large scale equipment, because of the constant precautions then needed to assure that the ignition temperature of 545° C. is never reached in any portion of the apparatus containing the explosive mixture. By operating below the explosive limits the precautions needed to obviate an explosion are greatly reduced. There are ordinarily no by-products of the reaction other than carbon dioxide and water. The ethylene oxide is recovered from the products of reaction by absorption in water under pressure or in a dilute acid solution in which case the ethylene oxide is hydrolyzed to glycol. If necessary, the aqueous solution can be evaporated to 90 percent glycol concentration.

The temperature employed in the preparation of ethylene oxide is in the range from 150° C. to 400° C. However temperatures as low as 100° C. have been used. Although the temperature will depend upon the activity of the catalysts, the ethylene and oxygen concentration, and the space velocity, a desirable temperature range is from 200° C. to 300° C.

The ratio of air to ethylene has a very pronounced effect on conversion. In addition, a high air to ethylene ratio is most favorable for obtaining both good yields and conversions. However as the catalyst ages it becomes less and less efficient for the production of ethylene oxide. On continued use the temperature of operation of the catalyst must be raised if maximum efficiency for the production of ethylene oxide is to be maintained. Thus for good yields a high air to ethylene ratio must be maintained, the yield rising rapidly until the volume ratio of reactants becomes about 7:1 to 8:1. No improvement in yield is realized at ratios above 10:1. It is therefore desirable to operate at ratios above about 8:1. However, the permissible ethylene concentration for a nonexplosive mixture is set by the lower explosive limit which is 3.4 volume per cent. Therefore volume per cents of air greater than 96.6% have been used in the reaction mixture to provide the dilution necessary to keep below said explosive limit. Further dilution is effected by recycling effluent gases which contain a relatively low concentration of ethylene. Buildup of inert gases in the system may be controlled by bleeding a portion of the recycle gas. Further control of concentration of ethylene and of the amount of air employed can be obtained by stagewise addition of ethylene to the reacting gas, part of the ethylene being added with the initial air and further portions being added after conversion of a portion of the ethylene in the reaction mixture. Pressure has little effect on the process, so atmospheric or slightly superatmospheric pressures are employed.

The optimum space velocity is a function of the activity of the catalyst and the temperature of operation. For a definite air to ethylene ratio as the contact time becomes shorter, the temperature of operation of the catalyst must be raised if maximum conversions are to be obtained. By way of example with a catalyst prepared by coating corundum with silver oxide, and with an air to ethylene ratio of 10 to 1 if the contact time is from 4.73 to 5.10 seconds the temperature for optimum conversion should be from about 250° C. to about 270° C. If the contact time is from 1.14 to 1.25 seconds then the temperature for optimum conversion should be from say 275° C. to 290° C. On the other hand for a contact time in the range of 0.56 to 0.60 second the temperature for optimum conversion should be between 280° C. and 290° C.

In accordance with a preferred embodiment of the present invention in a process for preparing ethylene oxide which comprises oxidizing ethylene in the presence of an oxidation-promoting catalyst at an elevated temperature to form ethylene oxide and passing ethylene oxide through a dilute sulfuric acid solution to form ethylene glycol, an improvement is provided which comprises conducting the air and ethylene mixture into at least one porous reactor within a cooling chamber containing dilute sulfuric acid as the coolant, and passing the ethylene oxide so formed through the sulfuric acid coolant to form ethylene glycol.

In order to provide a better understanding of the invention the accompanying drawing is provided which shows two reactors of the type contemplated herein.

Figures 1 and 2 illustrate the invention with two different types of catalytic reactors.

In Figure 1 reactor 1 is in the form of a porous tube which is within chamber 2 containing a dilute sulfuric acid coolant. The ethylene-oxygen reactor is also shown in cross section in Figure 1. In the embodiment shown therein the reactor is an ordinary porous reaction tube filled with catalyst 3.

Another embodiment of the invention is shown in Figure 2. In Figure 2 the reactor within chamber 2a comprises an outer porous tube 1a and an inner perforated tube 4 designed for better gas distribution. The catalyst 3a in Figure 2 is placed between the tubes 4 and 1a.

It is, of course, understood that one or more ethylene-oxygen reactors can be disposed within a single cooling chamber. In another embodiment of the invention the ethylene-oxygen reactor employed within the cooling chamber can be impregnated with the silver or other catalyst; for example the ethylene-oxygen (or air) reactor can be made of porous alundum impregnated with silver. On the other hand, only the inner surface of the reactor can be silver impregnated, and not the outer surface.

The catalysts employed in the manufacture of ethylene oxide are metallic oxidation promotors. The metals may be in a pure form or, more desirably, on a support. Examples of suitable supports are pumice, glass, carborundum, and fused alumina. Among the metals which have been tried are platinum, iridium, osmium, tantalum, tungsten, gold, silver or their alloys. However, by far the most important catalyst in metallic silver or silver oxide on a support. Various oxidation promotors have been used e. g. barium oxide or hydroxide. In addition inhibitors for carbon dioxide formation for example volatile organic halogen compounds such as ethylene dichloride can be employed in conjunction with the silver, as is well known in the art, but their effect is small and their use not necessary.

In the practice of this invention, therefore, a mixture of ethylene and air preheated to 200° C. to 250° C. of such proportions as to be just below the lower explosive limits is pumped into a reactor for example, reactor 1 in Figure 1, passing through porous ceramic tubes either impregnated or filled with catalytic metallic silver. The thickness of the tubes, their porosity and the flow rate is adjusted so as to make the contact time 1½ to 4 seconds. The tubes are immersed in a vessel 2 or 2a through which dilute sulfuric acid, usually about a 0.5 per cent or a 1 per cent solution, is flowing and the reaction mixture diffuses through the tubes into the acid. The ethylene is oxidized to ethylene oxide which is immediately hydrolyzed to ethylene glycol. The flow rate of the acid is adjusted to maintain the reaction temperature at an optimum, usually in the range from 200° C. to 300° C. The acid is cooled and recirculated. Means are, of course, provided for drawing off unreacted gaseous products. A side stream of the dilute glycol solution is continuously removed, neutralized and concentrated. Make-up dilute acide is added to replace that taken as a sidestream. The ethylene glycol so formed can be recovered by well known means.

It is understood that the cooling chamber and reactors can be of any desired shape. These can be cylindrical, or have square or rectangular sides. The reactor size will depend upon a number of variables, one of which is the size of the cooling chamber.

Considering the variables involved it is impossible to make general statements regarding the reaction equipment. However, one skilled in the art, by simple experiment can determine the optimum reaction conditions such as air to ethylene ratio, space velocity and temperature of reaction. At such conditions the heat transfer coefficient can be measured and the optimum economical reaction chamber or tube size and the optimum coolant temperature and rate can be calculated as will be well understood by those skilled in the art. Such calculations do not constitute a part of this invention which, in one aspect, is concerned with using dilute sulfuric acid as (1) a heat transfer medium for removing the heat of reaction in the preparation of ethylene oxide, as well as (2) a hydrolyzing agent for the ethylene oxide formed in the reactor. Since the determination of the coolant temperature and reaction tube size to be used is well within the skill of the art the instant invention should not be limited thereby.

In another embodiment of the invention the cooling chamber can contain water used as both coolant and absorbent, and the ethylene glycol can be subsequently prepared by hydrolysis. Before hydrolysis, if desired, part of the ethylene oxide may be removed from solution by evaporation and recovered as a product of the process. Still other modifications and variations will occur to those skilled in the art and are deemed to be within the spirit and scope of this invention.

I claim:

1. The process of preparing ethylene glycol, which comprises the steps of partial oxidation of ethylene in a first zone in a mixture of a minor portion of ethylene gas and a major portion of air in the gaseous phase over a partial oxidation catalyst to form a gaseous effluent comprising ethylene oxide, passing said effluent directly into a second zone into an aqueous liquid absorbent and coolant containing a minor portion of a hydration catalyst with said second zone disposed in direct heat exchange relation to and having a common boundary with the major portion of said first zone, hydrating said ethylene oxide to ethylene glycol in said liquid absorbent, supplying sufficient liquid absorbent to said hydration step in said second zone to remove the heat generated by said partial oxidation in said first zone and thereby heat said hydration step in said second zone, removing a similar amount of liquid effluent from said hydration step in said second zone to a third zone, and recovering etheylene glycol therefrom.

2. The process of preparing ethylene glycol, which comprises the steps of partial oxidation of ethylene in a first zone in a mixture of a minor portion of ethylene gas and a major portion of air in the gaseous phase over a partial oxidation catalyst at a temperature of from 100 to 400° C. to form a gaseous effluent comprising ethylene oxide, passing said effluent directly into a second zone into an aqueous liquid absorbent and coolant containing a minor portion of a hydration catalyst with said second zone disposed in direct heat exchange relation to and having a common boundary with the major portion of said first zone, hydrating said ethylene oxide to ethylene glycol in said liquid absorbent, supplying sufficient liquid absorbent to said hydration step in said second zone to remove the heat generated by said partial oxidation in said first zone and thereby heat said hydration step in said second zone, removing a similar amount of liquid effluent from said hydration step in said second zone to a third zone, and recovering ethylene glycol therefrom.

3. The process of preparing ethylene glycol, which comprises the steps of partial oxidation of ethylene in a first zone in a mixture of a minor portion of ethylene gas and a major portion of air in the gaseous phase below the lower explosive limit of 3.4 volume percent ethylene over a partial oxidation catalyst to form a gaseous effluent comprising ethylene oxide, passing said effluent directly into a second zone into an aqueous liquid absorbent and coolant containing a minor portion of a hydration catalyst with said second zone surrounding and disposed in direct heat exchange relation to and having a common boundary with the major portion of said first zone, hydrating said ethylene oxide to ethylene glycol in said liquid absorbent, supplying sufficient liquid absorbent to said hydration step in said second zone to remove the heat generated by said partial oxidation in said first zone and thereby heat said hydration step in said second zone, removing a similar amount of liquid effluent from said hydration step in said second zone to a third zone, and recovering ethylene glycol therefrom.

4. The process of preparing ethylene glycol, which comprises the steps of partial oxidation of ethylene in a first zone in a mixture of a minor portion of ethylene gas and a major portion of air in the gaseous phase below the lower explosive limit of 3.4 volume per cent ethylene over a partial oxidation catalyst at a temperature of from 100 to 400° C. to form a gaseous effluent comprising ethylene oxide, passing said effluent directly into a second zone into an aqueous liquid absorbent and coolant containing a minor portion of a hydration catalyst with said second zone surrounding and disposed in direct heat exchange relation to and having a common boundary with the major portion of said first zone, hydrating said ethylene oxide to ethylene glycol in said liquid absorbent, supplying sufficient liquid absorbent to said hydration step in said second zone to remove the heat generated by said partial oxidation in said first zone and thereby heat said hydration step in said second zone, removing a similar amount of liquid effluent from said hydration step in said second zone to a third zone, and recovering ethylene glycol therefrom.

References Cited in the file of this patent

UNITED STATES PATENTS

| | | |
|---|---|---|
| 2,125,333 | Carter | Aug. 2, 1938 |
| 2,135,271 | Balcar | Nov. 1, 1938 |
| 2,255,411 | Cohen et al. | Sept. 9, 1941 |
| 2,367,169 | Gardner | Jan. 9, 1945 |
| 2,454,869 | Goldsby et al. | Nov. 30, 1948 |
| 2,628,965 | Sullivan | Feb. 17, 1953 |

FOREIGN PATENTS

| | | |
|---|---|---|
| 196,972 | Great Britain | May 4, 1923 |